Dec. 7, 1965   J. M. SHELLY   3,221,673
STICK INSERTING MECHANISM
Filed July 12, 1963   3 Sheets-Sheet 3

INVENTOR.
JACOB M. SHELLY
BY

ATTORNEYS

United States Patent Office 3,221,673
Patented Dec. 7, 1965

3,221,673
STICK INSERTING MECHANISM
Jacob M. Shelly, Lansdale, Pa., assignor to Shelly Brothers, Inc., a corporation of Pennsylvania
Filed July 12, 1963, Ser. No. 294,548
11 Claims. (Cl. 107—8)

The present invention relates to a machine for automatically inserting sticks into molds containing candy syrup during the manufacture of candy suckers.

In order to manufacture candy suckers at the most rapid rate of production, it is desirable to employ horizontally extending conveyors carrying sucker molds into which the hot candy syrup is deposited by a vertically arranged dispenser such as described in detail in Patent No. 2,868,242 issued January 13, 1959, and in copending application Serial No. 294,491 filed July 12, 1963.

After each mold is filled with syrup by the operation of the dispenser, the mold travels a substantial horizontal distance during which time the syrup cools and partially solidifies so that the subsequently inserted sticks are retained in a vertical position by the partially solidified syrup.

It is therefore a principal object of the present invention to provide an automatic stick inserting mechanism the operation of which is compatible with the above indicated type of dispenser and mold conveyor so that a fully automated production line is made possible.

It is a further object of the present invention to provide a stick inserting mechanism which travels along with the molds during the injection of the sticks so that the sticks are properly orientated in the molds.

It is yet another object of the present invention to provide a stick inserting mechanism wherein any number of sticks may be inserted simultaneously as opposed to previously known mechanisms which are limited to the insertion of only two sticks at a time.

The above objects as well as others hereinafter set forth will become more fully apparent from the following description when taken with the accompanying drawings in which.

Figure 1:
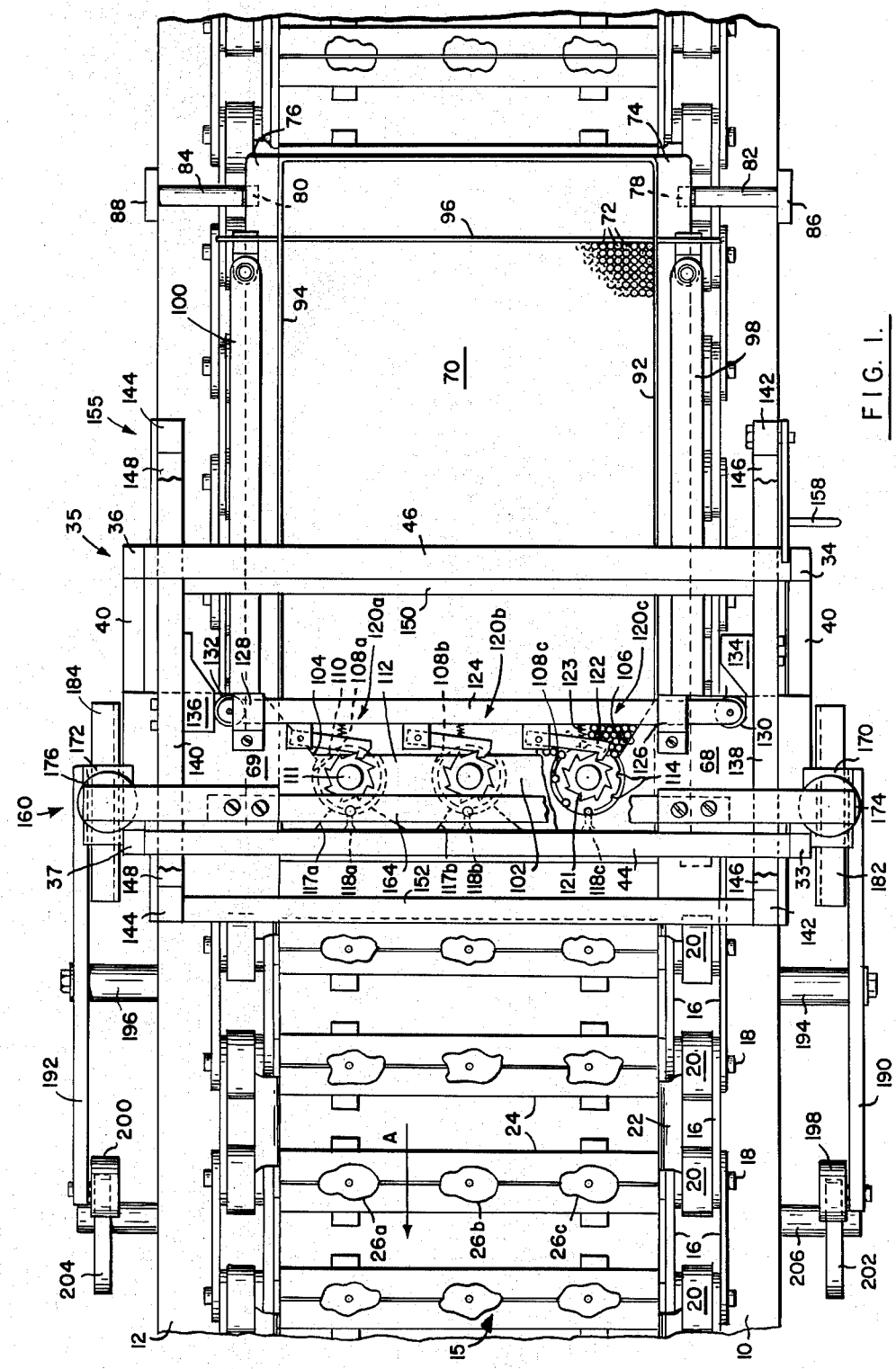
FIGURE 1 is a top, plan view of the stick inserting machine and mold conveyor with portions thereof broken away in section.
Figure 2:
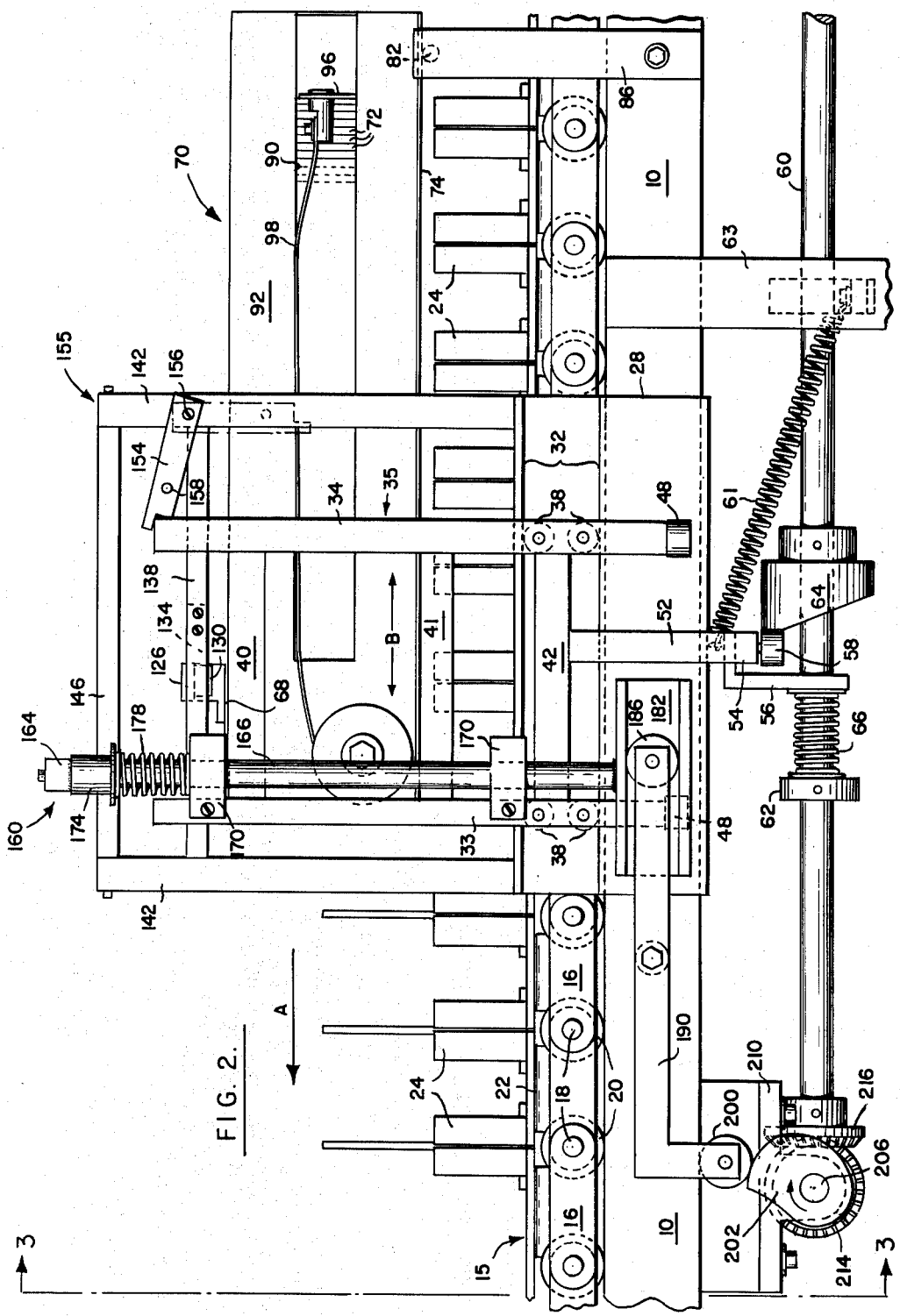
FIGURE 2 is a side, elevational view of the mechanism shown in FIGURE 1.
Figure 3:
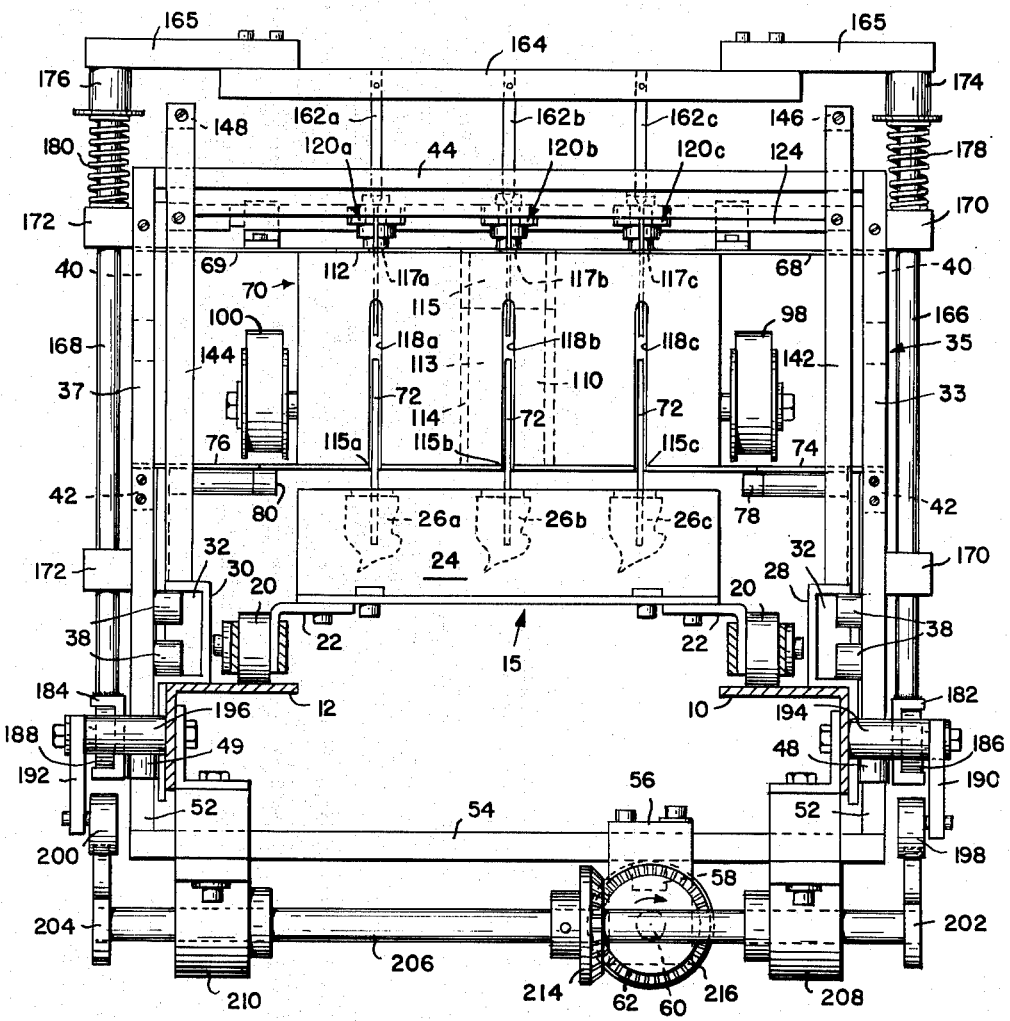
FIGURE 3 is a front view of the mechanism taken along the plane indicated by line 3—3 of FIGURE 2.

Referring first to FIGURES 1–3, a pair of horizontally extending, laterally spaced frame members 10 and 12 are provided for supporting the conveyor generally indicated by numeral 15. Of course, it will be understood that the complete conveyor comprises an endless belt trained about sprockets at opposite ends having upper and lower reaches only the former of which is illustrated. The upper reach of the conveyor moves in the direction indicated by arrow A and is of the link type having links 16 interconnecting adjacent shafts 18 each of which carries a roller 20 resting upon the upper surface frame members 10 and 12. Each pair of adjacent shafts 18 also support intermediate brackets 22 which support adjacent halves of two successive molds 24. This construction maintains each pair of mold halves in abutting relationship so long as the conveyor advances in a straight line and causes the halves to separate when the conveyor turns about the sprocket (not illustrated) located at the forward end of the belt. Thus, the separation of the molds permits the completed suckers to drop out of the molds and into a collecting bin (not illustrated).

As shown in FIGURES 1 and 3, each mold is provided with a plurality of laterally spaced cavities 26a–26c which are illustrated as being of irregular shape so as to produce suckers formed as animals. Of course, the particular shape and the number of cavities per mold is in no way limited to that illustrated, but rather, the number of cavities per mold may be as large as desired.

Referring now to the mechanism comprising the stick inserting machine, frame members 10 and 12 respectively support guide plates 28 and 30 the upper portions of which are of channel-shaped cross-section forming horizontally extending guideways 32 which guide the reciprocating movements of a carriage generally indicated by numeral 35. Carriage 35 includes a set of four vertically extending bars 33, 34, 36 and 37 each of which carries a pair of rollers 38 received in guideways 32. The pairs of bars 33, 34 and 36, 37 on opposite sides of the conveyor are interconnected by horizontally extending brackets 40, 41 and 42 while the upper ends of the leading and trailing pairs of bars 33, 37 and 34, 36 are interconnected by laterally extending braces 44 and 46. The lower ends of bars 33 and 34 carry rollers 48 engaging the lower portion of bracket 28 while the lower ends of bars 36 and 37 carry rollers 49 engaging the lower portion of bracket 30. Thus, the carriage is guided against lateral shifting. In order to horizontally reciprocate carriage 35, the carriage further includes a pair of depending supports 52 rigidly connected to brackets 42 on laterally opposite sides of the carriage. The lower ends of these supports are interconnected by a laterally extending brace 54 which mounts an abutment member 56 and a roller 58. Abutment member 56 surrounds a horizontally extending shaft 60 which carries a fixed stop member 62 and a cylindrical cam 64. A compression spring 66 is interposed between stop 62 and abutment member 56 and a second spring 61 is connected between abutment member 56 and a depending bracket 63 so as to bias the carriage to the right as viewed in FIGURE 2 and thereby maintain roller 58 in cam following engagement with cam 64, the latter of which moves the carriage to the left in timed relationship with the forward movement of the conveyor as will be subsequently described in detail.

Carriage 35 supports a rectangular tray generally indicated by numeral 70 which contains a supply of vertically extending sticks 72, the tray being connected to brackets 40 by a pair of upper, laterally extending flanges 68 and 69. The bottom of tray 70 is provided with a second pair of flanges 74 and 76 which rest upon rollers 78 and 80 carried by pins 82 and 84 rigidly supported by vertically extending supports 86 and 88 the lower ends of which are rigidly secured to frame members 10 and 12, respectively. Thus, the tray is mounted for reciprocation with carriage 35.

Tray 70 further includes a pair of horizontally extending slots 90 in side walls 92 and 94. A rectangular bar 96 extends through slots 90 and the projecting ends of the bar are connected to the extended free ends of a pair of tension springs 98 and 100 the coiled portions of which are secured to walls 92 and 94 of the tray. Springs 98 and 100 are preferably of the type which provide a constant tension throughout their range of elongation so that a substantially constant force is maintained on the sticks 72 tending to move them toward the forward end of the tray.

At the forward end of the tray there is provided a block 102 having diverging surfaces 104, 106 to provide maximum access to tray 70 and three cut-out portions forming cylinders 108a–108c. Each of the cylinders receives a rotary barrel 110 having a shaft 111 the bottom end of which is journalled in the bottom of the tray and the upper end of which is journalled in a plate 112 extending over block 102 so that each barrel rotates about its vertical axis. As shown most clearly in FIGURES 1 and 3, each barrel includes a large diameter lower portion 113 having circumferentially spaced, vertical grooves 114 and a smaller diameter upper portion 115. It will also be noted that plate 112 is cut away at 117a–117c to permit access to vertical slots 118a–118c in block 102 which communicate with grooves 114 aligned therewith.

The stepped rotation of each barrel is effected through respective pawl and ratchet mechanisms 120a–120c which are identical in construction and operation so that only mechanism 120c will be described in detail. This mechanism includes a ratchet 121 secured to shaft 111 and a cooperating pawl 122 one end of which is biased into engagement with the ratchet by a spring 123 and the other end of which is pivotally connected to a transverse actuating bar 124. Bar 124 is mounted for lateral reciprocation by a pair of guide brackets 126 and 128 secured to flanges 68 and 69, respectively. The opposite ends of bar 124 carry rollers 130 and 132 which respectively engage stationary cams 134 and 136.

Cams 134 and 136 are rigidly secured to respective crosspieces 138 and 140 extending between pairs of vertical supports 142 and 144. The lower ends of supports 142 and 144 are rigidly secured to guide plates 28 and 30 and the upper ends of each pair of supports are connected by braces 146, 148, 150 and 152. It will therefore be apparent that the above described supports, crosspieces and braces comprise a stationary frame generally indicated by numeral 155 which, in addition to providing a support for cams 132 and 134, also serves to mount a latch 154 which is pivoted at 156 and adapted to engage transverse brace 46. Latch 154 carries a handle 158 whereby the latch may be moved into or out of engaging relationship with brace 150. It will therefore be apparent that the latch serves to lock the carriage in its leftmost position so that it is not reciprocated by cam 64 although the latter continues to rotate.

Reference is now made to the stick injector mechanism generally indicated by numeral 160. This mechanism includes a plurality of plungers 162a–162c the upper ends of which are secured to a laterally extending bar 164 the opposite ends of which are connected through extensions 165 to vertical actuating rods 166 and 168. These actuating rods are guided for vertical reciprocation in vertically spaced pairs of guide blocks 170 and 172 secured to carriage bars 33 and 37, respectively. The upper ends of rods 166 and 168 carry abutments 174 and 176 which engage one end of respective compression springs 178 and 180 the opposite ends of which bear against the guide blocks 170 and 172.

The lower ends of rods 166 and 168 are rigidly secured to channel-shaped guides 182 and 184 which receive rollers 186, 188 carried by actuating links 190 and 192, respectively. Links 190 and 192 are pivotally connected at their mid portions to lugs 194 and 196 rigidly secured to frame members 10 and 12, respectively. The opposite ends of the links carry rollers 198 and 200 which respectively engage cams 202 and 204 which are connected to opposite ends of a cam shaft 206 journalled for rotation in depending mounts 208 and 210 bracketed to frame members 10 and 12.

Cam shaft 206 carries a bevel gear 214 which is driven by a second bevel gear 216 secured to previously mentioned shaft 60.

From the foregoing description of the injector mechanism it will be apparent that rotation of shaft 60 rotates cams 202 and 204 which pivot links 190 and 192 about their pivot points and thereby vertically reciprocate rods 166 and 168 while the latter are horizontally reciprocated along with carriage 35 to which they are connected. Thus, the plungers are moved downwardly so as to simultaneously eject each of sticks 72 which are aligned with the respective apertures 115a–115c in the bottom of tray 70.

Figure 4:
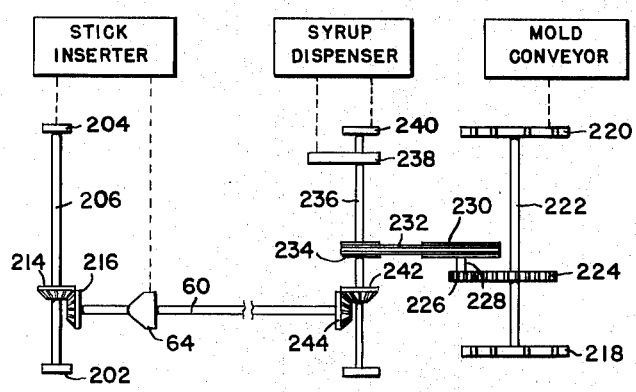
FIGURE 4 is a schematic diagram of the complete production line showing the drive connections between the mold conveyor, syrup dispenser and the stick inserting machine.

Reference is now made to FIGURE 4 which schematically illustrates the manner in which shaft 60 is driven in timed relationship with the mold conveyor. The conveyor is driven directly from an electric motor (not shown) and has one end trained over sprockets 218, 220 interconnected by shaft 222. Shaft 222 carries a gear 224 which meshes with a second gear 226 mounted on shaft 228 carrying a sprocket 230. A chain 232 interconnects sprocket 230 with a second sprocket 234 mounted on a shaft 236. Shaft 236 carries a first cam 238, a second cam 240 and a bevel gear 242, cams 238 and 240 being operative to actuate the syrup dispenser as described in the above mentioned copending application. Bevel gear 242 is in meshing engagement with a second bevel gear 244 which is secured to shaft 60 so as to rotate the latter and thereby transmit the drive for operating the stick inserting mechanism.

In operation, the various components of the stick inserting mechanism function in the following manner. Assuming that latch 154 is moved to the dotted line position shown in FIGURE 2, springs 61 and 66 maintain roller 58 in engagement with cam 64 so that the latter reciprocates the carriage 35, tray 70 and stick injector mechanism 160. The cycle of operation is initiated when the mechanism is in the position illustrated in FIGURE 1 wherein all of the horizontally reciprocating elements are in their forwardmost position and begin to move toward the right as viewed in this figure. Movement in this direction causes actuating bar 124 to be laterally shifted as rollers 130 and 132 follow their respective cams 134 and 136. Lateral movement of bar 124 thereby rotates each of the barrels through the pawl and ratchet mechanisms so that one stick in each barrel is brought into alignment with the respective aperture 115a–115c in the bottom of the tray when the carriage reaches its rightmost or backward position. Of course, the angular positions of the cams, gears and sprockets connecting cam 64 to the conveyor as shown in FIGURE 4 are such that each stick is then positioned directly above the center of a respective cavity 26a–26c.

Immediately upon reaching this rightmost position, the carriage moves to the left due to cam 64 which moves the carriage and tray at the same speed as that of conveyor 14. Thus, the sticks remain aligned with the centers of their respective cavities. Immediately upon the beginning of forward movement of the carriage, cams 202 and 204 pivot links 190 and 192 so that rollers 186 and 188 move rods 166 and 168 downwardly against the biasing force of springs 178 and 180. This downward movement is transmitted to each of the plungers which engage the associated sticks and eject the sticks from the respective barrels and push the sticks into the respective mold cavities, the complete injection of the sticks occurring during the forward movement of the carriage assembly.

By the time that the carriage assembly again returns to its forwardmost position shown in FIGURE 1, the ejected sticks have cleared the upper portions of block 102 and are free to continue their forward movement along with their respective molds by passing through slots 118a–118c in block 102. Furthermore, rollers 198 and 200 have passed over the maximum rise of cams 202 and 204 so that the plungers are returning to their initial position as shown in FIGURE 3. Thus, a cycle of operation is completed and the carriage again moves to the right so as to become aligned with the succeeding mold and the above described cycle of operation is then repeated.

From the foregoing description it will be apparent that the operating speed of the conveyor may be varied so as to permit complete filling of the molds by the dispenser and the stick inserting mechanism will continue to operate in a synchronized manner since its speed will be automatically varied through shaft 60.

It will also be apparent that a continuous supply of sticks is fed to each of the barrels due to the biasing of the sticks in the forward direction by means of springs 98 and 100. In this regard, it should be noted that the use of constant tension springs which may be conventional permits bar 96 to move throughout an extended range wherein the extended length of the spring may be in the order of ten times the length when the spring is fully contracted. This results in permitting the tray to be filled with as many as five thousand sticks without imposing an excessive biasing force which would tend to jam the sticks between the barrels and respective cylinders.

It will also be apparent that the same dispenser and mold conveyor may be employed to form hard candies without sticks and that the stick inserting mechanism may be simply moved into and out of operating positions by latch 154 without the necessity of re-timing the mechanism so as to be synchronized with the conveyor.

Lastly, it will be apparent that the number of barrels may be increased to any desired number since there is no limitation as to the number of cavities per mold.

Of course, it is to be understood that the foregoing description relates only to a preferred embodiment of the invention and that numerous modifications and alterations may be made therein without departing from the scope of the following claims.

What is claimed is:

1. A machine for inserting sticks into molds carried by a conveyor comprising a carriage, means mounting said carriage for reciprocating movement forward and backward generally parallel to the direction of conveyor movement, means for reciprocating said carriage, means supported by said carriage for containing a supply of sticks, means supported by said carriage for positioning a plurality of individual sticks in alignment with respective molds, means for simultaneously injecting said sticks into said respective molds, means for actuating said injecting means during reciprocating movement of said carriage in the direction of movement of said molds, and means for synchronizing the speed of said last-mentioned movement of said carriage with the speed of movement of said molds.

2. The machine as claimed in claim 1 wherein said means for reciprocating said carriage includes a cam, means for rotating said cam at a speed proportional to the speed of the conveyor, and cam follower means connected to said carriage for reciprocating said carriage.

3. The machine as claimed in claim 2 including means for selectively holding said cam follower out of engagement with said cam so as to selectively terminate reciprocation of said carriage.

4. The machine as claimed in claimed 1 wherein said stick positioning means include more than two elements for simultaneously positioning more than two sticks in alignment with respective molds.

5. The machine as claimed in claim 1 wherein said stick positioning means includes a plurality of rotary barrels having grooves for receiving sticks from said supply means, stationary cam means, and actuator means including cam follower means carried by said carriage and engaging said stationary cam means for simultaneously rotating said barrels so as to align a plurality of sticks with respective molds.

6. The machine as claimed in claim 5 wherein said actuator means includes a common element connected to said cam follower means and a plurality of drive mechanisms individually connected to said barrels and said common element for simultaneously rotating said barrels.

7. The machine as claimed in claim 1 wherein said injecting means include a plurality of plungers and means mounting said plungers for vertical reciprocation.

8. The machine as claimed in claim 7 wherein said actuating means include a cam and means for actuating said cam at a speed proportional to the speed of the conveyor.

9. The machine as claimed in claim 1 wherein said supply means includes mechanical means biasing said sticks into engagement with said stick positioning means with a constant force throughout extended periods of operation.

10. The machine as claimed in claim 1 in combination with a dispenser for filling said molds and drive means for synchronizing the operation of said dispenser with that of said conveyor and stick inserting machine.

11. A machine comprising a conveyor, molds mounted on said conveyor in spaced relation longitudinally, each of said molds having a plurality of laterally spaced mold cavities simultaneously advanced to successive longitudinal mold positions by the conveyor, a carriage, means mounting said carriage in spaced relation to and for forward and backward reciprocating movement relative to the direction of movement of said conveyor, stick supply means for said molds on said carriage, means for moving said conveyor, means for reciprocating said carriage, means interconnecting said last two-mentioned means for successively aligning said stick supply means with successive longitudinal mold positions on said conveyor with successive forward movements of said carriage, means for synchronizing successive forward movements of said carriage with the movement of said conveyor, and means for actuating said stick supply means with successive forward movements of said carriage to simultaneously inject a stick in each mold cavity when aligned with successive mold positions.

References Cited by the Examiner
UNITED STATES PATENTS 1,960,456  5/1934  Robb _____ 107—8.05
2,892,423  6/1959  Glass _____ 107—8.05

WALTER A. SCHEEL, *Primary Examiner.*

CHARLES A. WILLMUTH, *Examiner.*